United States Patent
Bishop et al.

[15] 3,696,798
[45] Oct. 10, 1972

[54] COMBUSTION PROCESS FOR ENGINE OF SPARK IGNITION, FUEL INJECTION TYPE

[72] Inventors: Irving N. Bishop, Farmington; Richard G. Mosher, Dearborn; Aladar O. Simko, Dearborn Heights, all of Mich.

[73] Assignee: Ford Motor Company, Dearborn, Mich.

[22] Filed: Nov. 14, 1969

[21] Appl. No.: 876,717

[52] U.S. Cl. .........123/32 ST, 123/32 R, 123/32 CY, 123/119 R, 123/140 R
[51] Int. Cl. ........F02b 3/00, F02b 75/00, F02b 33/00
[58] Field of Search......123/106, 108, 110, 100, 124, 123/32 ST, 32 JT, 119 R, 32 CY

[56] References Cited

UNITED STATES PATENTS

| | | | |
|---|---|---|---|
| 2,882,873 | 4/1959 | Witzsky | 123/32 |
| 3,174,470 | 3/1965 | VonSeggern | 123/32 |
| 3,195,520 | 7/1965 | Simko | 123/32 |
| 3,315,650 | 4/1967 | Bishop | 123/32 |
| 3,318,292 | 5/1967 | Hideg | 123/32 |
| 3,418,981 | 12/1968 | VonSeggern | 123/32 |
| 3,439,656 | 4/1969 | Hideg | 123/32 |
| 3,443,552 | 5/1969 | VonSeggern | 123/32 |
| 3,494,336 | 2/1970 | Myers | 123/32 |
| 3,498,276 | 3/1970 | Aardenbert | 123/32 |

*Primary Examiner*—Laurence M. Goodridge
*Assistant Examiner*—Ronald B. Cox
*Attorney*—John R. Faulkner and Robert E. McCollum

[57] ABSTRACT

Process minimizes the production of undesirable elements in the engine exhaust by operating the engine with an overall rich mixture air/fuel ratio combustion without air throttling at full load operation, and a progressive fuel supply cutback as the load decreases without air throttling until a desired air-fuel ratio leanness is reached, at which point air throttling is introduced to maintain the air/fuel ratio constant regardless of further decrease in load.

4 Claims, 5 Drawing Figures

INVENTOR.
IRVING N. BISHOP
RICHARD G. MOSHER
ALADAR O. SIMKO
BY
John R. Faulkner
Robert E. McCollum
ATTORNEYS

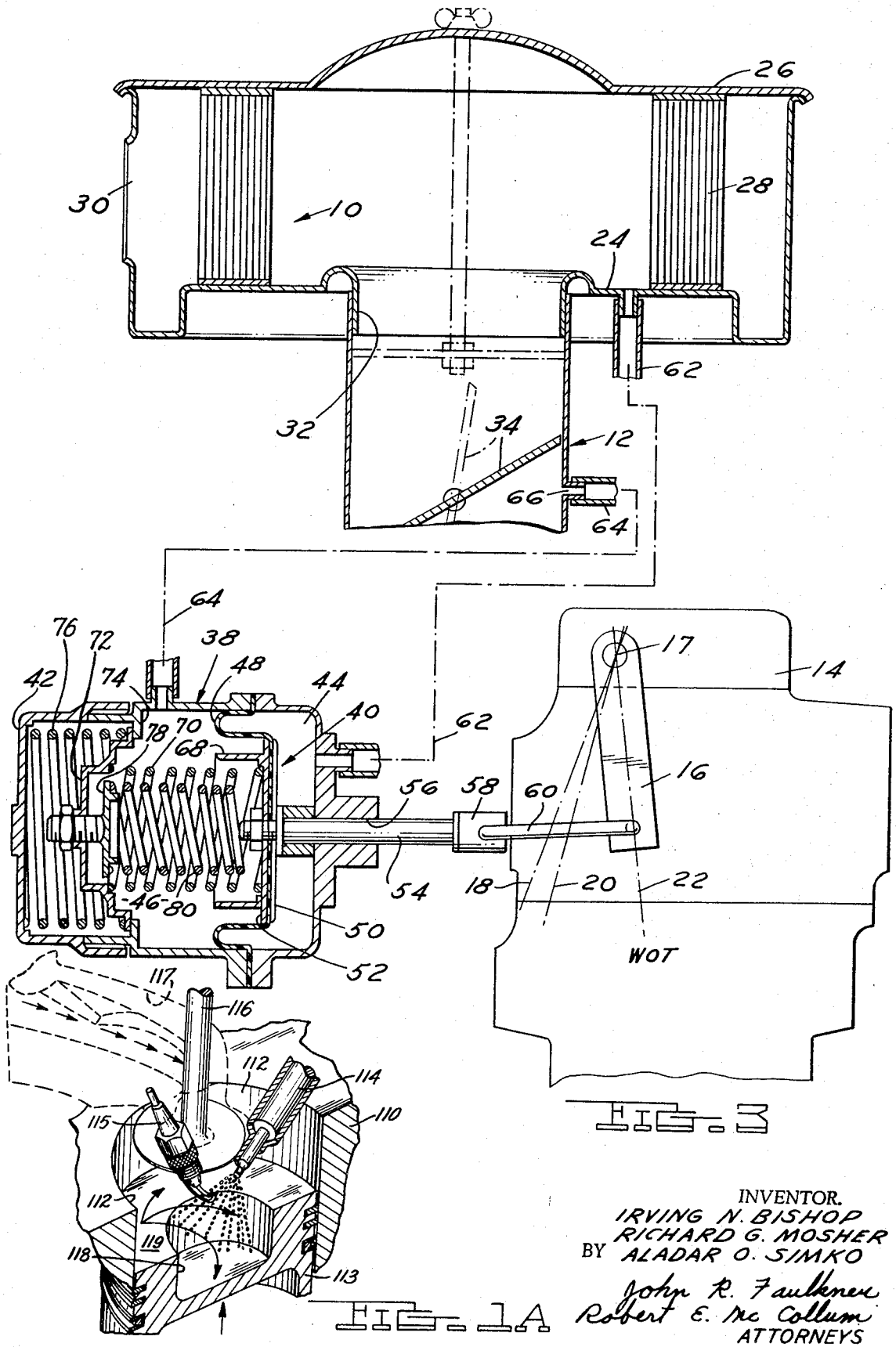

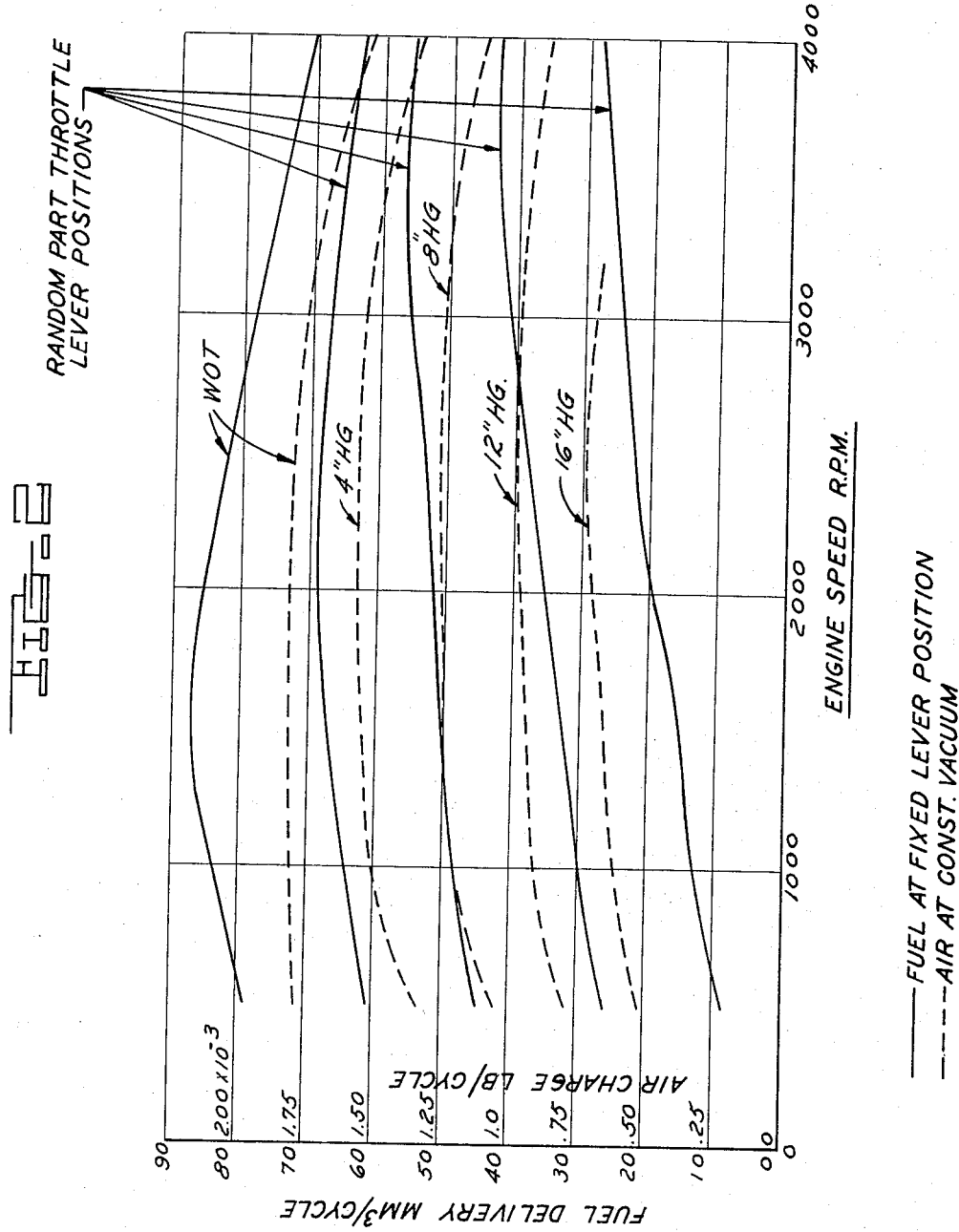

COMBUSTION PROCESS FOR ENGINE OF SPARK IGNITION, FUEL INJECTION TYPE

This invention relates, in general, to a combustion process for an internal combustion engine. More particularly, it relates to a combustion process for an engine in which fuel is injected directly into the engine combustion chambers and the air supply is throttled or unthrottled as need be to maintain a desired air-fuel ratio over the major portion of operation of the engine.

Stratified charge combustion processes are known in which an essentially unthrottled charge of air is taken into an engine at all times and fuel is injected directly into a localized portion of this charge of air, the quantity varying with the load and operating requirements of the engine. An example of such a process is shown and described fully in U.S. Pat. No. 3,315,650. The latter teaches injecting fuel at low pressures through wide conical angles into an essentially unthrottled charge of air in the combustion chamber of an engine; the pressure and other controls being such as to cause a slow dispersing of the fuel particles into the air in a manner permitting control of the air-fuel ratio change so that the locally rich mixture can be ignited at the proper time to assure complete combustion occurring with a predetermined crankshaft degree rotation and before the overall air-fuel ratio becomes too lean.

The patented process briefly described above has fuel economy for its primary objective. Exhaust emissions of unburned hydrocarbon, carbon monoxide and nitric oxide elements, for example, while they may be at acceptable levels, can be lowered considerably, however, by slightly modifying the above patented process.

More specifically, undesirable carbon monoxide and unburned hydrocarbon elements generally can be reduced to less harmful forms by the addition of oxygen at some period prior to passage out of the exhaust system. Present production engines utilize secondary air injected into the exhaust port of each cylinder to chemically combine with these unburned hydrocarbon and carbon monoxide elements and convert them to carbon dioxide and water before passage into the atmosphere. This is but one of many proposed systems. However, such a system is expensive and requires constant maintenance. Additionally, oxides of nitrogen emissions are encouraged by high combustion chamber temperatures and the presence of oxygen. Leaner mixtures reduce the peak combustion chamber operating temperatures, but increase the oxygen availability. A richer mixture will reduce the peak temperature as well as the oxygen.

Accordingly, it will be seen that if the stratified charge combustion process engine of U.S. Pat. No. 3,315,650 is modified to provide late injection into a throttled air charge, that overrich air-fuel ratios will exist in the combustion zone, i.e., in the localized zone of burning, and yet the overall air-fuel ratio will be lean. Therefore, the oxides of nitrogen ($NO_x$) output will be lowered by the rich mixture lowering the peak temperature; and the high overall air-fuel ratio reduces the carbon monoxide (CO) and unburned hydrocarbon (UHC) output. It should be noted also that if further reduction in both $NO_x$ and CO and UHC elements is desired, the exhaust gases can be recirculated to the combustion chamber to displace more of the fresh air. This, of course, would not be useful at full load, as the maximum output of the engine is determined by the oxygen intake capabilities. Therefore, at full load, maximum intake of fresh air is desirable. Also, exhaust gas recirculation generally is not desired at idle speed operation, because poor scavenging of the cylinders generally exists at this time normally. The exhaust gas recirculation, therefore, generally follows a schedule as shown in FIG. 1, and as will be described later.

The invention accomplishes the above objectives by introducing throttling of the engine air intake during engine idle and part load conditions of operation to provide a localized overrich mixture surrounded by a portion that is maintained at a desired leanness.

It is a primary object of the invention, therefore, to provide a combustion process for an internal combustion engine that will minimize the presence of undesirable elements in the engine exhaust gases.

A further object of the invention is to provide an engine combustion process that operates the engine with a rich mixture combustion without air throttling during full load conditions, for maximum output, while throttling the air intake in a predetermined proportion to fuel cutback during idle speed and part throttle operations to maintain an essentially constant air/fuel ratio with an overrich mixture in the combustion zone and an overall lean air/fuel ratio in the cylinders, to minimize the presence of unburned hydrocarbons and other undesirable elements in the exhaust gases.

A further object of the invention is to provide a combustion process in which exhaust gases are recirculated into the engine cylinders to reduce oxygen availability and reduce engine peak combustion temperatures.

Other objects, features and advantages of the invention will become more apparent upon reference to the succeeding detailed description thereof, and to the drawings illustrating preferred embodiments thereof; wherein, FIG. 1 illustrates, graphically, the changes in air-fuel ratio for an internal combustion engine embodying the invention with changes in load when no air throttling is provided as compared to when throttling according to the invention is provided during part load and idle speed conditions of operation; it also illustrates the recirculation of exhaust gases as a function of engine load;

FIG. 2 illustrates, graphically, changes in fuel delivery and air flow with changes in engine speed for essentially constant settings of a fuel injection type pump and an engine having throttled and essentially unthrottled air intake;

FIG. 3 illustrates, schematically, a cross sectional view of a portion of an internal combustion engine air and fuel control system embodying the invention; and, FIG. 4 is a cross sectional view of a modified form of the invention illustrated in FIG. 3.

As stated previously, the invention contemplates using essentially unthrottled air intake at wide open throttle conditions of operation where the maximum power output of the engine is determined primarily by the air intake capability; and, throttled air operation at part loads and engine idle operating conditions. As also stated previously, it is desired that the overall air-fuel ratio during part load and idle speed conditions be maintained substantially at a constant level so that the air-fuel mixture does not become so lean as to extend the desired time for completion of combustion or otherwise interfere with the efficient operation of the engine in other ways. As also stated, it is desired to recirculate exhaust gases at times to control the oxygen availability and combustion chamber peak temperature level.

Figure 1:
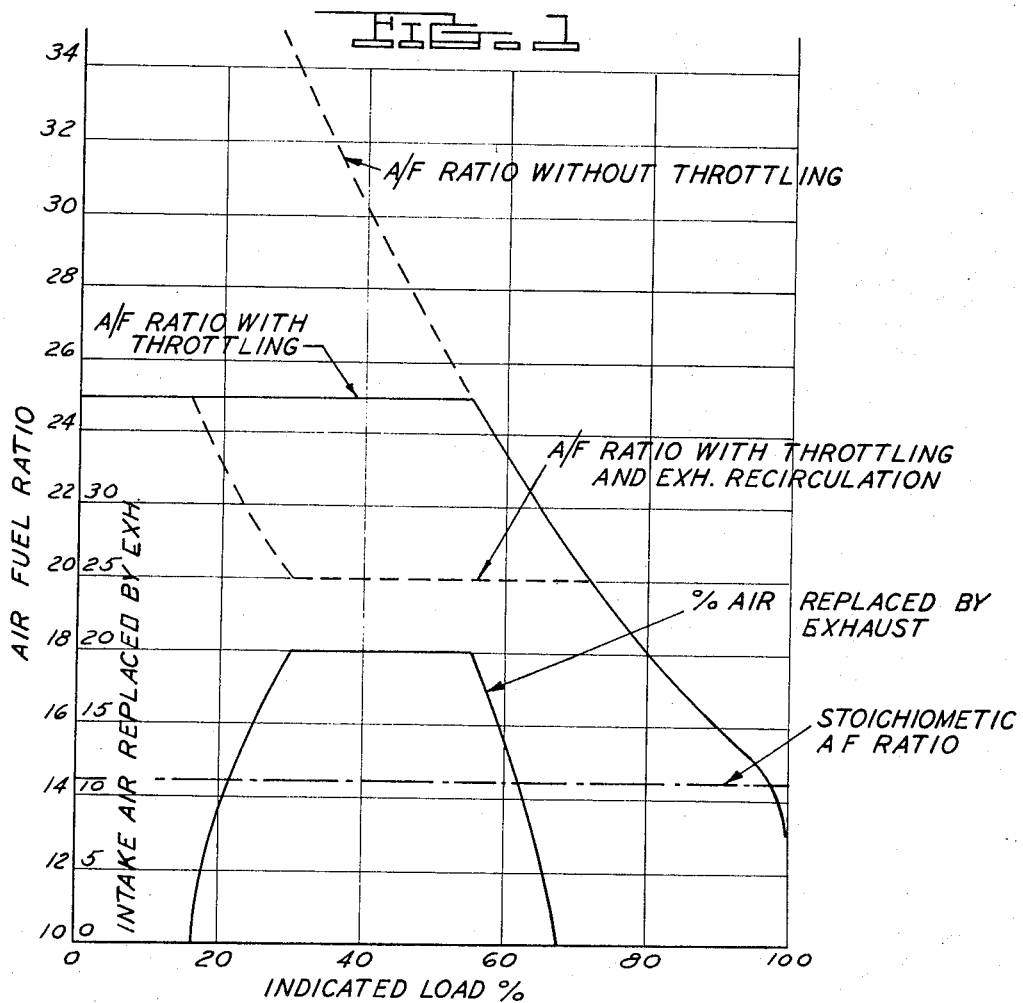
FIG. 1A is a perspective cross-sectional view of an engine cylinder constructed to utilize the process of the invention.

The above objectives are illustrated graphically in FIG. 1. Changes in air-fuel ratio are plotted against changes in engine load. As will be seen, at full throttle (100 percent load), the overall engine air-fuel ratio is rich and approximately 13 to 1, and the air intake is unthrottled. In the stratified charge engine of U.S. Pat. No. 3,315,650, as the load decreased, the overall air-fuel ratio would continually increase. This is indicated by the labeled dotted line curve.

However, as stated above, it is desired for the combustion process of the invention that the overall cylinder air-fuel ratio at part load and idle speed conditions of engine operation be maintained essentially constant, or at about 25 to 1. This is to provide an overall lean air-fuel ratio but not so lean as to provide inefficient or undesirable engine operation. Accordingly, air throttling alone begins at a part load, in this case, of approximately 55 percent, and continues to engine idle to maintain the overall air-fuel ratio at about 25:1. This is indicated by the labeled solid horizontal line.

If, instead of utilizing throttling alone of the air intake, some of the exhaust gases are recirculated, then the dotted line indicated and labeled accordingly illustrates when throttled air intake combined with recirculation of exhaust gases occurs. The frustro conical-like shaped full line curve also indicates the approximate percentage of air replaced by the exhaust gases. As the curve shows, additional recirculation of exhaust gases is not desired at engine idle conditions, as the scavenging of exhaust gases at this time normally is not completely satisfactory; also, at full throttle, all of the air is utilized; therefore, no recirculation of gases is desired. The present invention shows no structure for accomplishing recirculation of exhaust gases.

As thus far described, therefore, it will be seen that at wide open engine throttle conditions of operation it is desired to operate without air throttling at about a 13 to 1 overall rich air-fuel ratio. As the engine load decreases, cutback in fuel delivery without throttling of air will progressively lean the air-fuel ratio until the desired minimum at approximately 25 to 1 is reached, at which point the air will then be progressively throttled so as to maintain the ratio essentially constant from this point down to and including idle operating conditions.

FIGS. 3 and 5 shows the invention in one operative embodiment providing all of the controls illustrated graphically in FIG. 1 except that for the recirculation of exhaust gases.

More specifically, the internal combustion engine, not shown, on which the air and fuel control system of the invention is to be used, normally includes an air cleaner assembly 10 providing a supply of fresh filtered air to an engine air induction passage 12. The latter is adapted to be connected to the engine intake manifold, not shown, to supply this air directly to the individual combustion chambers of the engine, one of which is illustrated at 112 in FIG. 1a. The essentially fresh air would pass through the intake valve 116, which has an off-center position to induce a swirling motion to the air, for mixing purposes. The piston 113 is illustrated in its compression stroke, where valve 116 has closed. As the piston approaches top dead center position, injection of fuel through an injector 114 is commenced, after which, combustion is initiated by an igniter 115 in accordance with the timing as fully described in U.S. Pat. No. 3,315,650 previously referred to.

Returning to FIG. 3, the engine, in this case being of the fuel injection type, would include a fuel injection pump indicated diagrammatical at 14. The latter provides a timed injection of predetermined quantities of fuel into the individual combustion chambers in a known manner.

The details of construction and operation of pump 14 are not given since they are known and believed to be unnecessary for an understanding of the invention. Suffice it to say, however, that this pump could be of the type fully shown and described in U.S. Pat. No. 3,319,568 maintaining a controlled flow of fuel to each of the engine combustion chambers as a function of the changes in engine speed and operating conditions. Pump 14 in this case includes a fuel flow control lever 16 that is rotatably movable about a pivot 17 from a fuel shut off position 18 through an idle speed operating position 20 to a wide open throttle, maximum fuel delivery position 22. In each case, the appropriate quantity of fuel is delivered, varying from or near zero at position 18 to a maximum at position 22.

Turning now to the details of the invention, the air cleaner assembly 10 includes the conventional lower cup-shaped tray portion 24 closed by annular cover 26 and containing an annular filter element 28. The latter may be of any known suitable type such as a pleated paper dry element type. The assembly 10 includes an air inlet 30 in one side wall, and an axial or centrally located air outlet 32. The latter is adapted to cooperate, as shown, with the upper inlet portion of an air induction passage 12 supplying the entire air requirements for the engine.

In this case, passage 12 contains a pivotally mounted butterfly type throttle valve 34 that moves rotatably between the position shown essentially closing passage 12 and an essentially vertical position, indicated in dotted lines, opening wide passage 12. The latter position provides a minimum restriction to the flow through the passage and would correspond to unthrottled air operation of the engine.

The degree of rotation of the pump fuel lever 16 and the scheduling of its movement is controlled in this case by a vacuum controlled servo motor means 38. The latter contains a diaphragm type slidable piston means 40 that is differentially responsive to the air pressure in induction passage 12 on opposite sides of throttle valve 34. It, therefore, automatically schedules the output flow of fuel from injection pump 14 as a function of the changes in engine intake manifold vacuum.

FIG. 2 shows typical delivery characteristics of a pump of the type at 14. In general, at any fixed setting of the throttle lever or accelerator pedal, the fuel delivery per cycle is nearly constant throughout the speed range. Also, at any given engine intake manifold vacuum level, the air consumption per cycle of the engine is essentially constant throughout the speed range. Accordingly, it will be seen that the position of the throttle lever can be a convenient indicator of the fuel output of pump 14; i.e., by assigning a given lever position to a given vacuum level, a nearly constant air-fuel ratio operation can be maintained throughout the speed range. As stated previously, a nearly constant air-fuel ratio is desired during part throttle and idle speed operations of the engine, as indicated in FIG. 1.

Vacuum controlled servo means 38 includes a two part outer hollow housing 42. It is divided into two chambers 44 and 46 by an annular flexible diaphragm member 48. The latter is secured between a pair of annular retainers 50 and 52 that are secured on a slidable shaft 54. The shaft projects sealingly through an opening 56 in the base of housing 42, and is pivotally secured by a connector 58 and a lever or link 60 to the fuel pump fuel flow control lever 16.

Right hand chamber 44 is connected by a conduit 62 to the clean air side of air cleaner filter element 28 so as always to be subjected to air at essentially atmospheric pressure. There will be a slight pressure drop across air filter element 28, but for all intents and purposes, the air in conduit 62 can be considered as at atmospheric pressure. In contrast, left hand servo chamber 46 is connected by a conduit 64 to the induction passage 12 at a location 66 that is below throttle valve 34 when the latter is in any of its operative positions. Accordingly, chamber 46 will always be subjected to the vacuum in the intake manifold of the engine. Diaphragm 48, therefore, will be differentially acted upon by the two air pressures in conduits 62 and 64 so as to slidably move diaphragm or piston means 40.

The diaphragm retainer 52 is formed with a projecting annular flange 68 that serves as a seat and guide for a compression spring 70. The latter is seated at its opposite end against a shoulder on a stepped diameter annular holder 72 that itself is slidably movable in the housing 42. Holder 72 normally is maintained positioned as shown against a housing annular lip flange 74 by what will be termed a deceleration cutoff spring 76. The latter is seated at its opposite end against one end of the housing 42.

Completing the construction, the holder 72 further supports the stem of a valve seat member 78 that positions what will be termed a constant air-fuel ratio spring 80. The latter spring is shown freely extended and normally does not contact the diaphragm retainer 52, or if it does, does not exert a force thereagainst in its free state. This will be explained in more detail later.

Deceleration cut off spring 76 is chosen with a preload sufficient to maintain the holder 72 in the position shown so long as the engine intake manifold vacuum in line 64 does not become stronger than that normally existing during idle speed operating conditions of the engine when throttle valve 34 is in a closed position. Spring 76 has a very soft rate so that when the preload is exceeded, spring holder 72 will move immediately to the left with substantially no resistance offered by the force of spring 76.

The preload of delivery spring 70, on the other hand, is chosen to be very low, i.e., what will correspond to a vacuum force slightly larger than the minimum engine vacuum force available at wide open throttle conditions of operation of the engine. That is, when the engine is operating at wide open throttle with the throttle 34 in the nearly vertical position, the pressure drop across the throttle plate between conduits 62 and 64 usually will not be more than 0.8 inches of mercury at maximum speed. The force of spring 70 is chosen with a preload corresponding to a vacuum slightly larger than 0.8 inches of mercury so that the fuel pump lever 16 normally will be biased at wide open throttle position to the WOT position indicated at 22.

The spring 80 is designed to have a low rate to facilitate substantial reduction in fuel delivery with the least possible air throttling or vacuum up to the point where a 25 to 1 air-fuel ratio is reached. That is, once spring 80 is engaged by the leftward movement of the diaphragm retainer plate 52, the change in fuel delivery with changes in vacuum due to throttling at part load will be such as to always maintain the air-fuel ratio at an essentially constant 25 to 1 value.

Figure 4:
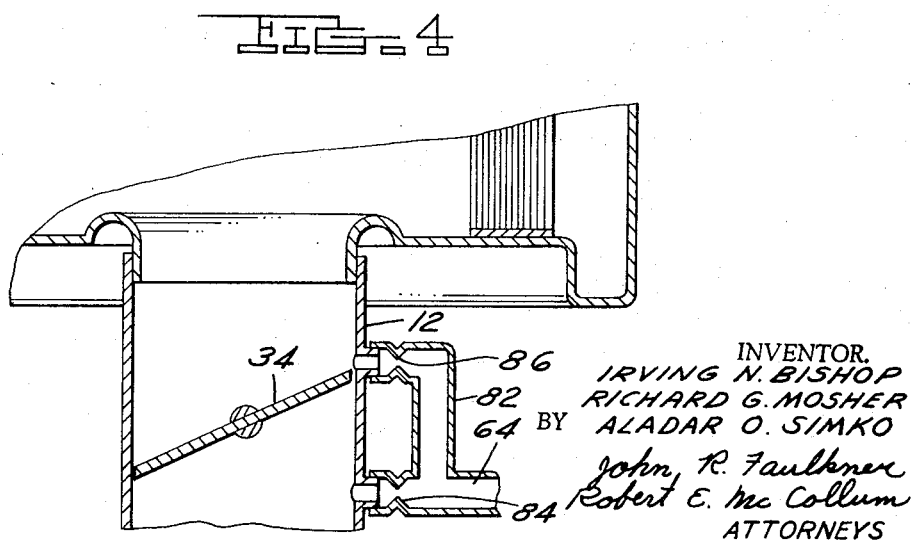

As indicated in FIG. 2, it will be seen that at the lower part loads, there is a slight gradual increase of the air-fuel ratio as the engine speed goes down, for each set position of the throttle lever, because of the fuel flow decrease. This might adversely affect the operation of the engine if no corrections were made, primarily because the air-fuel ratio would be slightly leaner than desired for low speed operation, and high speed fuel economy would be affected. The invention compensates for this by utilizing the construction illustrated in FIG. 4.

More specifically, conduit 64 is provided with a branch passage 82 connected to induction passage 12 at a location above the throttle valve 34 when it is in its closed position. Both main and branch passages 64 and 82 contain flow restricting orifices 84 and 86. Therefore, when the engine is operating at part throttle, low speed operation, with throttle valve 34 near a closed position, the air at atmospheric pressure bled into branch passage 82 will decrease the vacuum signal in conduit 64 and, therefore, slightly increase the fuel delivery at this time as compared to operation under the FIG. 3 construction. An essentially constant air-fuel ratio, therefore, will be maintained. Conversely, when operating at wide open throttle conditions, both passages 82 and 64 will be subjected to the same vacuum level and no change in fuel delivery from that indicated in FIG. 2 will occur.

Turning now to the overall operation, it is to be remembered that a primary purpose of the invention is to provide low outputs of UHC, CO and $NO_x$ elements, and at wide open throttle conditions of operation, maximum performance is desired without air throttling. Accordingly, the throttle valve 34 is scheduled to be moved from the full line position shown to the dotted line nearly vertical position (FIG. 3) in which essentially no throttling of the air induction passage 12 is provided.

Considering first the operation at full throttle. At this time, the two passages 62 and 64 will be essentially at the same air pressure; i.e., there will be only a slight pressure difference between the two. Accordingly, the pressure differential between servo chambers 44 and 46 will be relatively small and smaller than the force exerted by spring 70. Therefore, piston means 40 will be urged to the right to the position shown, positioning fuel control lever 16 at the wide open throttle position 22. This corresponds to the position indicated in FIG. 2 at the lower right hand corner of the graph.

Now, as the engine load decreases upon increase in engine speed, throttle valve 34 will begin to move or be moved progressively from the vertical position towards a more horizontal position, by releasing the accelerator pedal. As the throttle 34 moves, it progressively throttles the annular space between the valve and induction passage 12 so that he pressure drop across the valve begins to increase progressively. Accordingly, the engine intake manifold vacuum signal in conduit 64 now increases permitting the air at nearly atmospheric pressure in conduit 62 to move the piston means 40 to the left against the action of spring 70. This progressively decreases the fuel delivery and also progressively increases the air-fuel ratio in the manner indicated in FIG. 2 until the piston means 40 contacts the end of spring 80. The spring is so calibrated and chosen that at this precise point, the air-fuel ratio in the engine will be approximately 25 to 1, or that ratio that is desired to be held constant during the part throttle and idle speed operation of the engine.

Accordingly, from this point on, as throttle valve 34 progressively moves toward a closed position, the increase in vacuum in conduit 64 will operate against the force of spring 80 to a degree providing movement of fuel lever 16 in such a manner as to provide essentially a constant air-fuel ratio for the engine down to the idle speed position 20. Of course, this same operation will occur in reverse upon an engine speedup by depression of the vehicle accelerator pedal, causing valve 34 to progressively open and decrease the pressure differential between conduits 62 and 64.

As thus far described, therefore, it will be seen that the invention provides the operation desired; i.e., unthrottled air operation at wide open throttle conditions of operation where maximum oxygen is desired, and throttled operation at part load and idle speed operations providing essentially a constant overall air-fuel ratio providing low level outputs of CO and UHC due to the lean overall air-fuel ratio mixture and low $NO_x$ outputs because of the overrich localized air fuel mixture.

It will be recognized, of course, that during deceleration of the engine from a high speed, the higher than normal vacuum existing in the intake manifold of the engine normally, under the constructions described, will provide a very rich mixture in the combustion chamber resulting in possibly a high level of unburned hydrocarbons. To obviate this latter condition, servo motor means 38 is designed so that when the vacuum level exceeds the normal idle speed condition level, indicative of engine decelerating conditions of operations, the preload of spring 76 will be overcome and the fuel pump lever 16 moved to the fuel shutoff position 18 positively preventing supply of fuel to the engine combustion chambers at this time.

More specifically, when throttle valve 34 is moved to the essentially closed position shown, and the engine decelerates from a high speed, the vacuum level in conduit 64 will be very high causing the flange 68 of annular piston means 40 to engage the holder 72 with such a force as to overcome the preload of spring 76. Since the spring 76 has a very soft rate, immediately upon overcoming the preload, holder 72 will move to the left and bottom against the housing 42. This will be sufficient to position the pump lever 16 at the fuel shutoff position 18.

From the foregoing, therefore, it will be seen that the invention provides a fuel and air supply system for an internal combustion engine of the fuel injection type that efficiently controls the output of exhaust emissions by utilizing partial throttling of the air at part load and idle conditions of engine operations while maintaining an essentially constant air-fuel ratio during this period, and essentially unthrottled operation at full load or wide open throttle conditions of engine operation. It will also be seen that by means of the invention, additional accessories providing secondary air injection are unnecessary to control undesirable exhaust emission output levels.

While the invention has been illustrated in its preferred embodiments, it will be clear to those skilled in the arts to which it pertains that many changes and modifications may be made thereto without departing from the scope of the invention.

We claim:

1. A combustion process for operating an internal combustion engine of the spark ignition, fuel injection type during idle speed and part throttle conditions of operation, including the steps of, inducting a charge of essentially fresh air into each of the engine cylinders with a motion promoting mixing with fuel to be subsequently injected thereinto, injecting fuel into each of said cylinders late in the compression cycle so as to provide a localized overrich mixture in the combustion zone at the time of ignition thereby reducing the formation of oxides of nitrogen and an overall lean mixture in the cylinder, and progressively throttling the intake of said air into said cylinders and decreasing fuel flow thereinto upon decrease in load in a manner to progressively increase the air/fuel ratio from a near stoichiometric value until a predetermined value substantially greater than stoichiometric is reached whereby the said predetermined value substantially leaner than stoichiometric air/fuel ratio is thereafter maintained to provide total combustion within a predetermined period while minimizing residual quantities of unburned hydrocarbons and other undesirable elements in the combustion products.

2. A combustion process as in claim 1, including recirculating a portion of the exhaust gases into the engine cylinders during part throttle operations to reduce the formation of oxides of nitrogen by reducing availability of oxygen and thereby reducing peak combustion chamber temperatures.

3. A combustion process for operating an internal combustion engine of the spark ignition, fuel injection type over the entire load range of said engine comprising the steps of, inducting an unthrottled charge of essentially fresh air into each of the engine cylinders during wide open throttle full load conditions of engine operation, injecting fuel into each of said cylinders in a manner providing an overall slightly richer than stoichiometric air/fuel mixture in the cylinders upon mixing therebetween for a maximum output of said engine, igniting said charge, decreasing the fuel supply to said cylinders as a function of the decrease in engine load without throttling the intake of air thereinto so that the overall air/fuel ratio in said cylinder leans as engine load decreases, continuing the leaning until a minimum desirable air/fuel ratio lower limit substantially leaner than stoichiometric is reached, and subsequently continuing to inject fuel into each cylinder late in the compression cycle whereby a localized over-rich mixture exists in the combustion zone at ignition thereby reducing the formation of oxides of nitrogen while progressively throttling the air intake into said cylinders in proportion to the decrease in load on said engine in a manner to maintain essentially constant the substantially leaner than stoichiometric overall air/fuel ratio in said cylinders the latter being lean enough to minimize the existence of unburned hydrocarbons and other undesirable combustion products and yet sufficiently combustible to complete total combustion within a predetermined time providing optimum efficient engine operation.

4. A combustion process as in claim 3, including recirculating exhaust gases into the engine cylinders during part throttle operations to reduce the formation of oxides of nitrogen by reducing peak combustion temperatures.

* * * * *